United States Patent [19]

Younger

[11] 4,449,426
[45] May 22, 1984

[54] LAMINATED SEPARATOR PLATE MEANS FOR RECALIBRATING AUTOMATIC TRANSMISSIONS

[76] Inventor: Gilbert W. Younger, 2621 Merced Ave., El Monte, Calif. 91733

[21] Appl. No.: 63,051

[22] Filed: Aug. 2, 1979

Related U.S. Application Data

[63] Continuation-in-part of Ser. No. 824,271, Aug. 15, 1977, abandoned.

[51] Int. Cl.³ .................... F16K 1/00; F16H 57/02
[52] U.S. Cl. .................... 74/867; 74/606 R; 74/843; 137/884
[58] Field of Search ............ 74/843, 867, 868, 606 R; 137/884, 269; 60/458

[56] References Cited

U.S. PATENT DOCUMENTS

| | | | |
|---|---|---|---|
| 3,465,774 | 9/1969 | Kautz et al. | 137/884 |
| 3,495,604 | 2/1970 | Trask | 137/884 |
| 3,523,547 | 8/1970 | Hatch, Jr. et al. | 137/884 |
| 3,548,849 | 12/1970 | Purcell | 137/884 |
| 3,658,088 | 4/1972 | Jensen et al. | 137/884 |
| 3,747,628 | 7/1973 | Holster et al. | 137/269 |
| 3,840,047 | 10/1974 | Gibbins | 137/884 |

FOREIGN PATENT DOCUMENTS 1295907 11/1972 United Kingdom ............... 137/884

OTHER PUBLICATIONS

Chrysler–Service Manual—1972 Torque Flight Transmission, pp. 21, 97–99.
Chrysler Service Manual—1978, pp. 21-90 to 21-97 and 21-71.

*Primary Examiner*—Leslie A. Braun
*Attorney, Agent, or Firm*—Ralph B. Pastoriza

[57] ABSTRACT

First, second and third plates make up a laminated separator plate structure for substitution in place of the normal separator plate provided between the valve body and the transmission case in an automatic transmission system. The center of the three plates includes various sized openings registering with correspondingly positioned openings in the first and third plates and also defines channels interconnecting additional openings provided in the first plate to reroute transmission oil in the various inter-related passages in the casing in such a manner as to decrease the shift time carried out by said automatic transmission system.

3 Claims, 6 Drawing Figures

LAMINATED SEPARATOR PLATE MEANS FOR RECALIBRATING AUTOMATIC TRANSMISSIONS

This application is a continuation-in-part of U.S. patent application Ser. No. 824,271 filed Aug. 15, 1977 now abandoned.

This invention relates generally to automatic transmissions for automobile engines and more particularly to novel laminated plate structures for calibrating the automatic shifting of gears.

BACKGROUND OF THE INVENTION

Most automatic transmissions for shifting gears in automobile engines comprise various sun and planetary gears with appropriate clutch plates and bands responsive to hydraulic oil pressure to hold one or more gears and thus change the effective ratio between input shaft speed from the engine and output shaft speed to the wheels. The heart of such transmission systems is a valve body and casing containing various inter-related passages, valves, springs and orifices. The valve body receives signals in the form of hydraulic pressures which function to shift various ones of the shift valves to thereby route the transmission oil through appropriate passages in the casing to clutch plates and bands (referred to as "apply units") and thus automatically effect sequential shifting within a given range. The referred-to signals in the form of hydraulic pressure are functions of the transmission shaft speed and torque.

The valve body itself cooperates with a separator plate normally positioned between the valve body and casing. This separator plate includes various sized and positioned orifices and openings communicating with various ones of the inter-related passages in the valve body and casing so as to route oil between the passages as well as through the passages to apply units. Essentially, this separator plate in cooperation with the valve body and casing "tells" the transmission when to shift and how to shift.

Stock or standard automatic transmissions effect shifting in a relatively "gradual" manner; that is, the shifting is calibrated to provide a relatively smooth acceleration when shifting from one gear to a next higher gear to thereby minimize "jerking".

While such type shifting is primarily provided for the comfort of the average driver, it exhibits a distinct disadvantage. More particularly, there results an extended slippage time between the clutch plates and bands which prevents the inertial energy from being effectively utilized. This energy is simply lost in the form of heat on the clutches and bands instead of being utilized for forward motion. As a result, continually operating a stock or standard automatic transmission at full throttle will cause early friction element failure.

In order to realize high performance and improve durability in an automatic transmission, the shifting must be recalibrated to precisely control the relatively complicated chain of events that occurs during every shift and must accomplish such control in a substantially briefer period or span of time. Actually, if the period of time between the start of a shift and its completion can be reduced, the overall life of the transmission is substantially increased.

Normally, to recalibrate a transmission system requires disassembly of many components including in many instances some of the sun and planetary gear structures themselves in the transmission. As an example, in certain concentric or coaxial gear assemblies it is possible to remove a sealing O-ring in order to effectively increase the area upon which transmission oil pressure acts in operating clutch plates or clutch bands. Access must thus be had to the main body of the transmission system. It would be desirable if there were some convenient means of simply recalibrating the valve body itself which is more readily accessible rather than require disassembly of the transmission gear system.

BRIEF DESCRIPTION OF THE PRESENT INVENTION

With the foregoing considerations in mind, the present invention contemplates the provision of a laminated separator plate means for substitution in place of the normal separator plate provided between the valve body and casing passages to the apply units.

The laminated plate structure itself includes various orifices and channels for altering the transmission oil interconnections between various passages in the valve body and the casing passages, all to the end that the rate of shifting of gears in the transmission system can be changed.

In the preferred embodiment of this invention, there are provided three plates having various openings assembled into a thin laminated composite structure readily substitutable for the normal separator plate without having to disassemble any other portion of the transmission. In other words, it is only necessary to remove the oil pan or sump and the valve body to effect the substitution. In certain instances, it is also possible to readily substitute certain new shift valves for shift valves normally provided in the valve body as well as the springs involved.

The center plate in the laminated plate structure itself includes channels for rerouting transmission fluid among the various passages in the valve body and the casing. Smaller or larger sized orifices may also be provided in the center plate to control the rate of oil flow therethrough from passages to the pump and from the pump back to the apply units.

The laminated plate structure as well as associated spring and valves can be provided in kit form so that a person himself can recalibrate his automobile transmission by simply following the instructions provided. No heavy duty tools are required. Once a desired calibrating has been completed, the time of shifting of gears as well as the duration of specific shifts are carefully modified resulting essentially in a shorter shift time with the attendant advantage of no longer wear of the clutch plates, bands, and other components making up the automatic transmission system.

BRIEF DESCRIPTION OF THE DRAWINGS

A better understanding of this invention will be had by now referring to the accompanying drawings in which.

Figure 1:
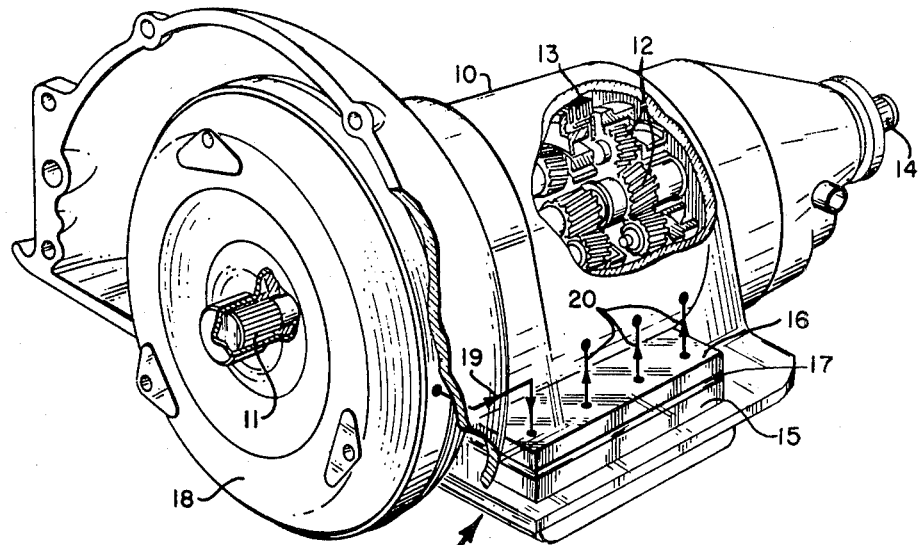
FIG. 1 is a cut-away perspective view partly schematic in form of a typical automatic transmission.

Referring now first to FIG. 1 there is shown a typical stock or standard automatic transmission 10 having an input shaft 11 from an automobile engine. Shaft 11 is coupled by way of various sun and planetary gears 12 with associated clutch plates and bands designated generally by the numeral 13 to an output shaft 14. The clutch plates and bands 13 are hereinafter also referred to as "apply units". Output shaft 14 connects to the driving wheels of the vehicle.

As described briefly heretofore, transmission oil of varying hydraulic pressures is applied to various ones of the apply units in the form of the clutch plates and bands to lock certain of the various gears in a stationary position and thereby change the speed ratio between the input shaft 11 and output shaft 14. Proper routing and timing control for this transmission oil is accomplished in a valve body 15 for the transmission system. Above the valve body is shown the transmission casing 16, there being provided a perforated separator plate 17 therebetween.

Transmission oil from an appropriate pump 18 is passed as indicated schematically by the line 19 into the casing 16 and thence through various orifices and the like in the separator plate 17 to various other passages in the valve body 15 and back up through the separator plate to passages in the casing 16 passing to the various clutches and clutch bands at appropriate times. The distribution is indicated schematically by the lines 20 passing from passages in the casing 16 to the apply units 13 in the transmission body 10.

As also mentioned heretofore, the time at which the hydraulic pressure is applied to various ones of the clutch plates and bands is determined by the transmission shaft speed as well as shaft torque. The pressure of the transmission oil is caused to vary in accord with the shaft speed and torque so that sequential shifting will occur, all as is well known to those skilled in the art.

Figure 2:
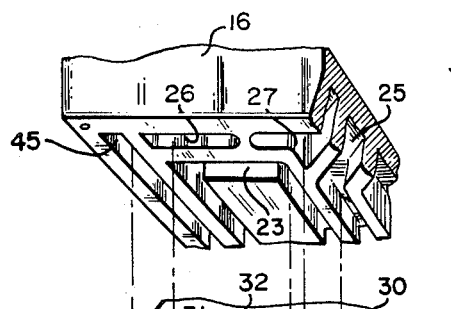
FIG. 2 is a graph illustrating the shifting characteristics of the automatic transmission of FIG. 1 prior to recalibration in accord with the present invention.
Figure 2:
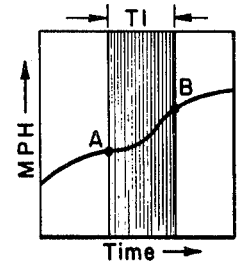

Referring now to FIG. 2, there is shown a diagram depicting the shifting of gears by a standard or stock automatic transmission, such shifting starting at the point A and being completed at the point B. The time period for the shift is designated T1 and it will be noted that the automobile will accelerate fairly smoothly. On the other hand, it will be appreciated that a relatively long period of time is required for the shift in question.

Figure 3:
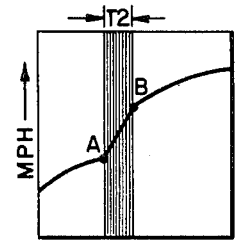
FIG. 3 is another diagram similar to FIG. 2 illustrating the improved shifting characteristics after recalibrating of the transmission of FIG. 1 in accord with this invention.

Referring now to FIG. 3, there is shown a similar diagram to that of FIG. 2 wherein the transmission has been recalibrated in accord with the present invention to substantially shorten the period of shift. Thus, it will be noted that the shift again starts at point A and terminates at point B in FIG. 3 but the time period designated T2 is much shorter. This shorter shift time has inherent advantages in that it decreases the wear on the clutch plates and clutch bands in the transmission system. Moreover, more efficient use is made of the inertial energy in the rotating shaft and other portions of the automobile.

Figure 4:
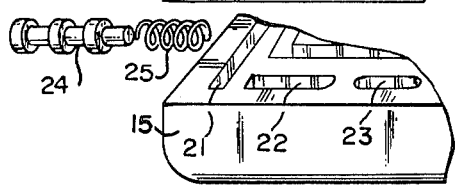
FIG. 4 is an enlarged fragmentary perspective view in exploded form of basic components making up the laminated separator plate means of this invention as well as illustrating a portion of the valve body and transmission casing generally located in the area indicated by the arrow 4 of FIG. 1.

Referring now to the FIG. 4 details of the manner in which the transmission is recalibrated by the present invention will become evident. In FIG. 4, there is shown only a small portion of the valve body 15 separated from the casing 16 and normally provided separator plate 17 described in FIG. 1.

Thus, the valve body 15 itself includes a plurality of inter-related passages such as indicated at 21, 22 and 23. Appropriate shift valves such as designated at 24 with cooperating spring 25 are received in the valve body 15 to intercept various ones of the passages. These shift valves are subject to hydraulic pressure of the transmission oil and when the force resulting from the pressure acting on the head of the valve exceeds that of the associated spring, the valve will shift and thereby reroute oil to appropriate passages for distribution to corresponding passages, such as indicated at 26 and 27, in the casing 16 leading to appropriate clutch plates and bands. The automatic shifting then ensues.

It will be appreciated from the foregoing, that recalibration can be accomplished by varying the spring constant of the shift valve springs so that the valves are faster acting or slower acting as desired and also by varying the rate of transmission oil flow between the valve body and casing. A variation in the rate, such as an increase will vary the time that appropriate transmission oil pressure acts. By providing fluid communication between various ones of the passages by means of the perforations in the normally provided separator plate, the desired sequence of distribution of transmission oil to the various clutch plates can be controlled.

It will be evident, accordingly, that by changing the configuration of the separator plate normally sandwiched between the valve body 15 and casing 16 as schematically indicated at 17 in FIG. 1, a desired retiming of the shifting operation can be achieved.

Thus, still referring to FIG. 4, and in accord with the present invention, there is provided a recalibrating laminated plate means or structure comprised of a first plate 28 having various openings of given dimensions and positions corresponding to those on the normally provided separator plate 17 of FIG. 1. Two such openings are illustrated at 29 and 30 for the plate 28 in FIG. 4. In accord with the recalibration technique, this first plate may also be provided with further additional openings such as indicated at 31, 32, 33 and 34. The purpose for these additional openings will become clearer as the description proceeds.

Shown below the first plate 28 is a second plate 35. Second plate 35 has some openings of given dimensions and positions similar to those on the normally provided separator plate 17 of FIG. 1. One such opening by way of example is indicated at 36. This second plate may also include at least one other opening of diameter less than at least one of the corresponding openings in the normally provided separator plate to thereby change the oil flow rate between one of the passages in the valve body to the casing and the apply units. An example of this latter type opening is indicated at 37 in FIG. 4, the same being positioned for registering with the opening 29 in the first plate 28 but being of substantially smaller diameter.

Finally, the second plate 35 is provided with elongated channels such as indicated at 38, 39, 40 and 41. The purpose for these channels will also become clearer as the description proceeds.

The plate assembly is completed by the provision of a third plate 42 having openings such as indicated at 43 and 44 corresponding in size and position to those provided on the normally existing separator plate.

Figure 5:
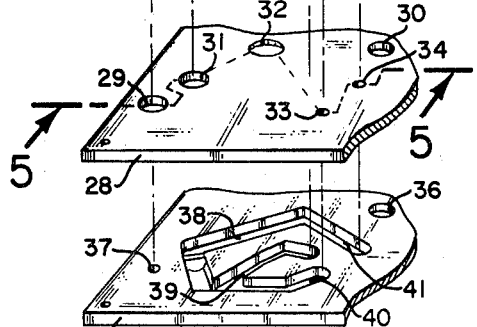
FIG. 5 is an enlarged fragmentary cross section of the components of FIG. 4 in assembled relationship.
Figure 5:
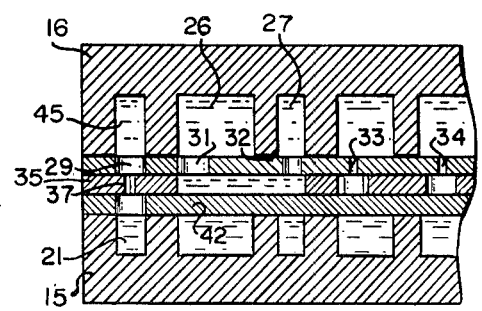

Referring now to FIG. 5, there are shown the fragmentary portions of the laminated plate structure together with that of the valve body 15 and casing 16 in assembled relationship. As described heretofore, the three plates making up the laminated plate structure are sandwiched between the valve body 15 and transmission casing 16 in lieu of the normally provided separator plate 17 of FIG. 1.

The cross section of FIG. 5 is taken along the jagged line 5—5 of FIG. 4 which intercepts the openings 29, 31, 32, 33 and 34 in the first plate 28. By so taking a cross section as described, the manner in which the smaller opening and various channels in the second plate 35 cooperates with the aforementioned openings will become evident.

Thus, for example, it will be noted that the smaller dimensioned opening 37 in the second plate 35 is in registration with the opening 29 and the opening 43 in the first and third plates respectively but because of its smaller diameter, it will slow down the rate of flow of oil between the passage 21 in the valve body 15 and corresponding positioned passage 45 in the casing 16.

Similarly, it will be noted that the channel 38 places the casing passage 26 by way of the opening 31 into communication with casing passage 27 by way of the opening 32. Note also that communication of these passages with the valve body 15 is blocked by the third plate 42 underlying the second plate 35.

It will thus be clear that the laminated plate structure provides a very convenient means of defining various channels and openings which recalibrate the interconnections of the passages and the rates and quantity of oil flow through the passages to the apply units without having to effect any modification of the valve body per se or casing, and without having to disassemble the transmission gears. The changing of the rate of oil flow between the passages as by making a smaller or larger dimensional opening as at 37 will change the time that it takes oil to act on various valves or on clutch plates and bands thus controlling time elements in the shift. The interconnection of various passages such as 26 and 27 by the channel 38 in the second plate enables the application of hydraulic oil pressure to both stepped annular areas of a normally sequentially operated clutch structure simultaneously, thereby greatly increasing the applied force and thus increasing the rapidity of the shift. In this respect, passage 26 in the casing would lead to one stepped area of an apply unit and passage 27 to another on the same unit.

It will be appreciated that the modifications can be made without altering many of the normally provided openings in the conventional separator plate so that various other operations which are not to be altered will be carried on in the normal manner. Thus, the first plate 28 will have various openings of given dimensions and position similar to those on the normally provided separator plate. The third plate 42 will have some openings of given dimensions and positions similar to those on the normally provided separator plate and others omitted. The second plate may provide eclipsing portions to block prior provided openings and may include channels and the like to effect various interconnections between passages not theretofore connected by the normal separator plate, all as described heretofore.

The time period between the start of a given shift and its completion can thus be recalibrated to a shorter period of time by the laminated plate means.

Figure 6:
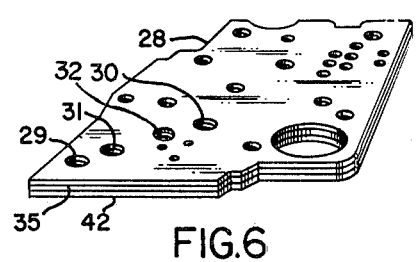
FIG. 6 is a reduced sized perspective view of the laminated separator plate structure of this invention wherein the thicknesses of the plates making up the structure have been exaggerated for purposes of clarity.

FIG. 6 is merely a perspective illustration of the laminated plate structure itself as it might be provided in a kit wherein the three laminated plates 28, 35 and 42 are shown in stacked relationship with the various openings corresponding to those described in FIG. 2 designated by the same numerals. It will be understood that the thicknesses of the plates have been greatly exaggerated for purposes of clarity. Actually, the overall thickness of the laminated plate structure is not appreciably different from the thickness of the conventionally provided separator plate so that the described substitution can be readily carried out.

From all of the foregoing, it will thus be appreciated that the present invention has provided a very convenient and unique means for recalibrating automatic transmissions wherein disassembly of the entire transmission can be avoided with a subsequent savings in time and expense.

I claim:

1. In a transmission system having a casing defining transmission oil passages to various apply units (clutch plates and clutch bands) and having a valve body with passages including shift valves interconnecting certain ones of said passages, and wherein there is provided a separator plate between said valve body and casing for routing oil between various ones of said passages to provide hydraulic oil pressure to various given ones of said apply units as a result of movement of said shift valve in response to changes in oil pressure resulting from changes in the transmission shaft speed and shaft torque to thereby automatically shift gears in said transmission, the combination of said valve body and casing with a laminated separator plate means for substitution in place of said separator plate to recalibrate the operation of said valve body, said laminated separator plate means comprising:

(a) a first plate having various openings of given dimensions and positions;
    (b) a second plate; and
    (c) a third plate having various openings of given dimensions and positions similar to those on said first plate sandwiching said second plate between itself and said first plate, said second plate having some openings of given dimensions and positions similar to those on said first plate and including one other opening of a diameter such as to change the oil flow rate between at least one passage in said casing and valve body whereby the time period between the start of a given shift and its completion is recalibrated to a different time by said separator plate means.

2. The subject matter of claim 1, in which said second plate additionally includes a channel positioned to connect two of said transmission oil passages in said casing together to thereby result in application of oil pressure on two areas of at least one of said apply units simultaneously whereby the time period between the start of a given shift and its completion is recalibrated to a shorter time by said separator plate means.

3. In a transmission system having a casing defining transmission oil passages to various apply units (clutch plates and clutch bands) and having a valve body with passages including shift valves intercepting certain ones of said passages, and wherein there is provided a separator plate between said valve body and casing for routing oil between various ones of said passages to provide hydraulic oil pressure to various given apply units as a result of movements of said shift valves in response to changes in oil pressure resulting in changes in the transmission shaft speed and shaft torque to thereby automatically shift gears in said transmission, a combination of said valve body and casing with a laminated separator plate means for substitution in place of said separator plate to recalibrate the operation of said valve body, said laminated separator plate means comprising:

(a) a first plate having various openings of given dimensions and positions;

(b) a second plate; and (c) a third plate having various openings of given dimensions and positions similar to those of said first plate sandwiching said second plate between itself and said first plate, said second plate having some openings of given dimensions and positions similar to those on said first plate and including a channel positioned to connect two of said transmission oil passages in said casing together to thereby result in application of oil pressure on two areas of at least one of said apply units simultaneously whereby the time period between the start of a given shift and its completion is recalibrated to a shorter time by said separator plate means.

* * * * *